Feb. 6, 1923.

C. A. ROWLEY.
WIDTH MAINTAINING APPARATUS FOR CONTINUOUS SHEET GLASS.
FILED DEC. 13, 1920.

INVENTOR
Clifford A. Rowley

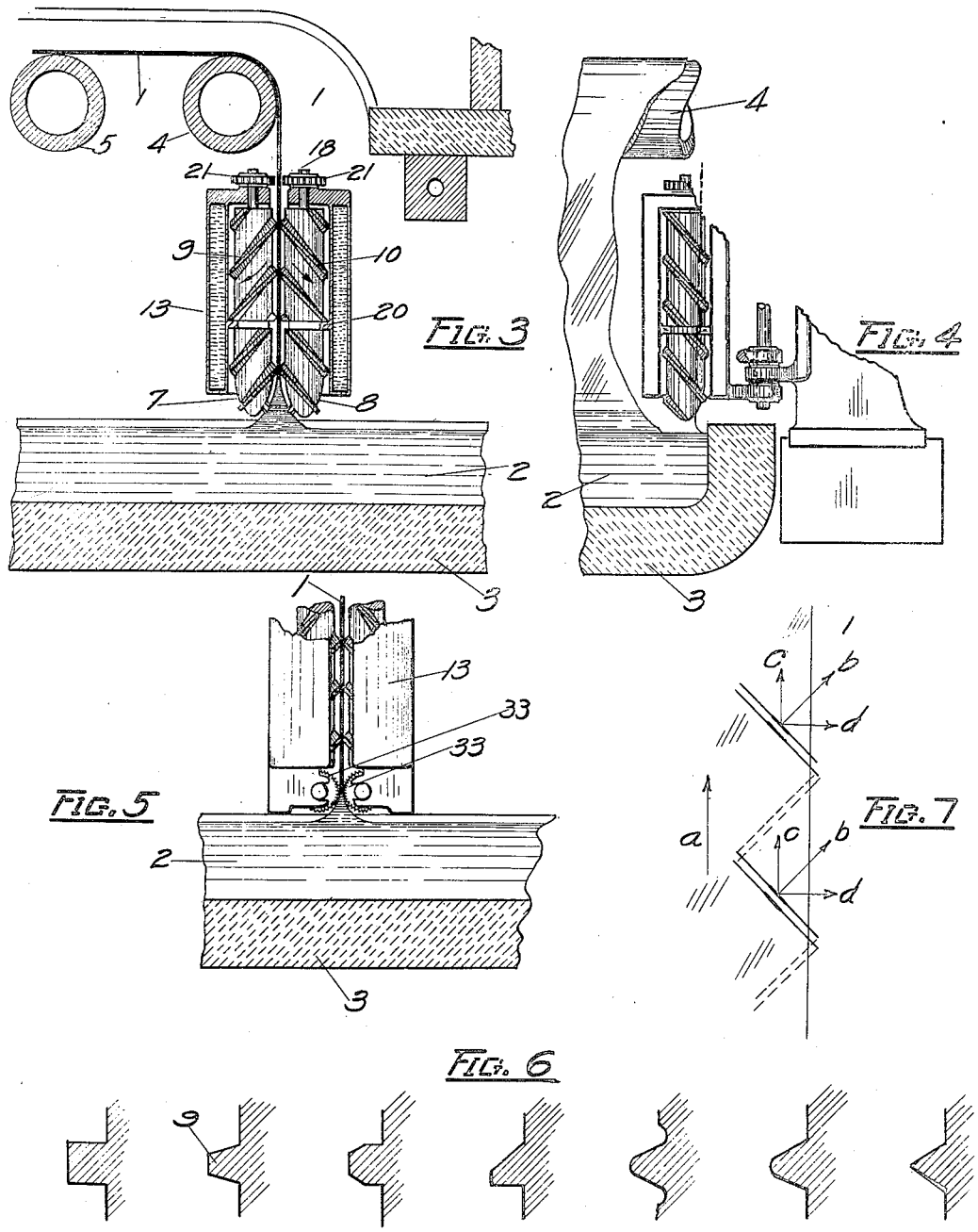

Patented Feb. 6, 1923.

1,444,039

UNITED STATES PATENT OFFICE.

CLIFFORD A. ROWLEY, OF TOLEDO, OHIO, ASSIGNOR TO THE LIBBEY-OWENS SHEET GLASS COMPANY, OF TOLEDO, OHIO, A CORPORATION OF OHIO.

WIDTH-MAINTAINING APPARATUS FOR CONTINUOUS-SHEET GLASS.

Application filed December 13, 1920. Serial No. 430,195.

*To all whom it may concern:*

Be it known that I, CLIFFORD A. ROWLEY, a citizen of the United States, residing at Toledo, in the county of Lucas and State of Ohio, have invented new and useful Improvements in Width-Maintaining Apparatus for Continuous-Sheet Glass, of which the following is a specification.

This invention is an improvement in the art of drawing continuous sheet glass, and relates more particularly to an apparatus for maintaining the width of the sheet, and stretching the sheet laterally, while the sheet is still in a semi-plastic condition.

While the present invention is not limited to use with any one system of producing sheet glass, it is illustrated as adapted for an apparatus of the general type set forth in the patent to Colburn, 1,248,809, granted Dec. 4, 1917. In this well-known system a continuous sheet of glass is drawn upwardly from a bath of molten glass, and then, while still in a plastic condition, is bent into a horizontal plane and carried off through a suitable drawing mechanism and into the leer. As is well-known in this art, unless some means is provided to maintain the width of the drawn sheet, it will gradually narrow away until no sheet is left. The present invention discloses a new form of apparatus for holding out the edges of the sheet as formed, to prevent narrowing, and at the same time an additional lateral tension is applied to the sheet to stretch it toward the edges and flatten it and remove wrinkles and waves. Specifically, the invention employs a series of rotating screws which yieldingly engage the edge portions of the sheet and simultaneously feed the same upwardly and outwardly.

The invention will be better understood from the following detailed description of certain forms of apparatus by which the invention may be carried into practice.

In the accompanying drawings:

Fig. 3 is a vertical section through the apparatus, taken at right angles to Fig. 1, and substantially on the line 3—3 of Fig. 2, the gears and rollers being shown in elevation.

Fig. 4 is a view similar to the right hand portion of Fig. 1, showing a modification in which only one screw is employed at each side of the sheet.

Fig. 5 is a partial side elevation of a modified form of the apparatus in which horizontal rollers are employed below the vertical screws.

Fig. 6 includes a series of diagrams showing sections through different forms of threads which may be used on the screw members.

Fig. 7 is a diagrammatic view illustrating the action of the rotating threads on the drawn sheet.

Figure 1:
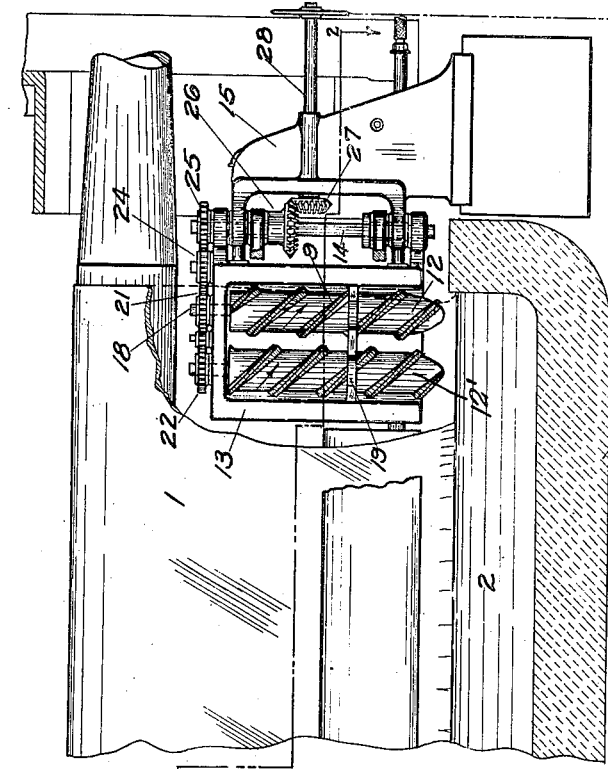
Fig. 1 is for the most part, a front elevation of one form of the width-maintaining mechanism, the pot from which the sheet is drawn being shown in vertical section, and at the right-hand side the sheet and the forward portion of the screw-mechanism is broken away substantially on the line 1—1 of Fig. 2.
Figure 2:
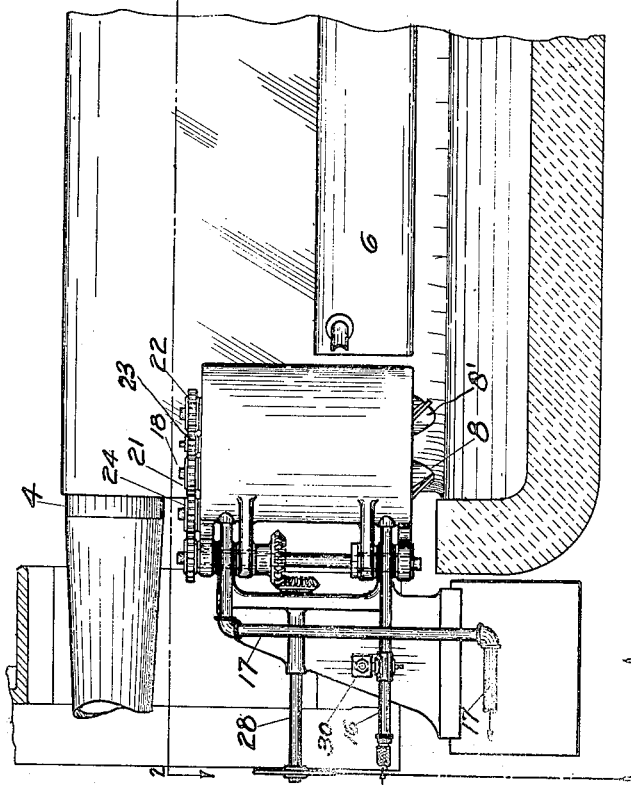
Fig. 2 is a plan view, partially in horizontal section taken substantially on the line 2—2 of Fig. 1.

Referring first to Figs. 1, 2 and 3, the sheet of glass 1 is drawn upwardly from the bath of molten glass 2 in the receptacle 3, and at a suitable height is bent laterally over the bending roller 4 and carried off horizontally over intermediate supporting roller 5, and through a suitable drawing mechanism (not shown), into the leer. The details of this portion of the mechanism, as well as the heaters employed to regulate the temperature at various points, may be varied as circumstances require and need not be described in detail. At 6 are shown coolers at the sides of the sheet near the drawing point to enable the drawing process to be carried out more rapidly, as is well known in this art.

The screw-devices employed at the two edges of the sheet are substantial duplicates, except for necessary reversals of the threads and driving gearing, and a description of one will suffice for both. Adjacent one side of the edge of the sheet (Fig. 3) is mounted a vertical cylindrical member 7 having a substantially conical lower end, and on its outer cylindrical surface are a series of steep pitched threads 9, which yieldingly engage with the side of the glass sheet adjacent its edge. A similarly shaped and threaded cylinder 8 is mounted at the opposite side of the sheet, the threads 10 being however of opposite pitch. The threaded cylinders are rotated in the direction of the arrows, so that their sheet contacting faces turn outwardly toward the edge of the sheet. At the opposite edge of the sheet are similar threaded cylinders 11 and 12. As shown in Figs. 1 and 2, a second set of cylinders 7', 8', 11' and 12' are located behind and parallel with the first set, each primed cylinder or roller being in all respects identical with the unprimed roller, but being mounted so that its threads are set at 90° from its mate. The only function of this duplicate set of rollers is to contact the sheet at twice as many points, in staggered relation with the contacting points of the first set, thus providing an added and evener side pull on the sheet. It is to be understood that one roller at each side of each edge of the sheet, as illustrated in Fig. 4, will ordinarily be sufficient. The action of these threaded rollers will be best understood if considered in connection with the diagram shown in Fig. 7. The rollers are rotated at such a speed that the threads will sweep across the somewhat plastic surface of the sheet at a faster speed than the sheet is being drawn. The sheet is traveling in the direction of the arrow $a$. The sheet contacting side of the threads, illustrated in heavy lines, will tend to move the sheet in the direction of the arrow $b$. This force will be resolved into a force in the direction $c$, which assists the drawing of the sheet, and a force in the direction $d$ which stretches the sheet toward its edge, thus maintaining it flat and removing wrinkles and corrugations. The points of contact of the threads with the sheet are constantly changing, functioning as if an infinite number of cams were constantly brushing diagonally across the sheet edge portion. Obviously the number of threads used (two are shown on each cylinder in the present drawings) as well as the inclination of the threads may be varied at will without departing from the principles of this invention.

The means by which these screw members are supported and driven may be varied as found convenient, the form illustrated in the drawings and now to be described being merely one example. The roller or rollers at each side of the sheet edge are carried by a casing 13, the two casings being pivoted on a vertical shaft 14, carried by a supporting bracket 15. Bracket 15 may be adjusted into and out of position adjacent the sheet edge to vary the positions of the screw rollers. Each casing 13 is so formed as to surround the greater part of the roller surfaces not in engagement with the glass sheet, and the casing is hollow and water-cooled, the water flowing in through the pipe 16 at the bottom of the casing, and out through the pipe 17 near the top of the casing. Thus the casings 13 serve not only to support the rollers, but also function as coolers to maintain the screw-rollers cool enough to prevent sticking to the glass sheet. Each threaded cylinder has a trunnion extension 18 at its upper end, which is journaled in the upper cross-piece of the casing 13, and near its lower end the threaded cylinder is grooved as at 19 to provide a bearing for the supporting collar 20 extending out from the inner face of the casing. Secured to the upper end of each trunnion 18, of cylinders 7, 8, 11 and 12 is a spur gear 21, and, if the second set of cylinders 7', 8', 11' and 12' is employed, each of these has a similar spur gear 22. Meshing between each pair of gears 21 and 22 is a spur pinion 23, thus causing each pair of cylinders to rotate in unison and in the same direction. Meshing with each gear 21, at the two sides of the sheet is a spur gear 24, and these two gears 24 are also in mesh with each other, thus causing the cylinders at one side of the sheet to rotate in the opposite direction from the opposed cylinders at the other side. Secured to shaft 14 and meshing with one of the gears 24, is a drive gear 25. Also secured to shaft 14 is a bevel gear 26, meshing with a second bevel gear 27, on horizontal drive shaft 28, journaled in the supporting bracket 15. The two drive shafts 28, at the opposite edges of the sheet, are simultaneously driven from any suitable source of power, as indicated by the sprocket connections shown in dotted lines in Fig. 1.

In the form of apparatus here illustrated, the two inlet pipes 16 also serve as lever extensions from the casings 13, to swing the rollers into and out of engagement with the glass sheet. Adjustably mounted in the bracket 15, is the threaded cross-rod 29, which passes at its ends through swiveled blocks 30 secured to the respective pipes 16. Expansion springs 31 surround each half of the rod 29, and are confined between the bracket 15 and the respective blocks 30, the outward movement of the blocks and pipes under the influence of the springs being limited by adjusting nuts 32 on the ends of rod 29. The springs 31 will normally hold the threaded cylinders yieldingly in engagement with the sides of the sheet, the extent of inward movement being limited by the adjustment of the nuts 32. If it be desired to separate the rollers from the sheet when moving them into or out of engaging position, it is only necessary to press the two pipe extensions 16 together, compressing the springs 31, and swinging the casings 13 apart. The two gears 24 will swing out of mesh to allow this operation.

In the alternative form of the invention illustrated in Fig. 5 the lower conical ends of the cylinders are omitted, and in their place are substituted short horizontal idler rolls 33, whose function is to flatten out the bottom of the drawing sheet while in its most plastic state, and feed it to the threaded rollers directly above. These horizontal rollers 33 may have smooth cylindrical surfaces or may have their surfaces roughened or knurled as shown in the drawing.

The threads 9 and 10 on the upright cylinders may be given any desired form to secure the best engagement with the glass sheet, several possible cross-sections of thread being illustrated in Fig. 6 by way of example.

In operation, the drawing of the glass sheet is first inaugurated by means of a bait as is usual in this type of apparatus. When the sheet has been started, the threaded cylinders are moved into place, being held out from the sheet by the pipe-handles 16, and when released will be pressed yieldingly in engagement with the sheet by means of springs 31. As previously explained these rotating threaded cylinders will act not only to retain the sheet to full width, but will also pull or stretch the sheet laterally, tending to draw out imperfections in the sheet. Simultaneously they will assist in drawing the sheet upwardly, although their action in this direction is merely supplementary to the main drawing mechanism.

I claim:

1. In an apparatus for drawing continuous sheet glass, width maintaining and sheet stretching mechanism, comprising members rotating on axes parallel to the sheet edges for simultaneously pulling the sheet laterally and longitudinally, the pull being exerted at a series of constantly shifting points along the sheet edges.

2. In an apparatus for drawing continuous sheet glass vertically, width maintaining and sheet stretching mechanism, comprising members rotating on vertical axes constantly engaging the sheet edges at continually shifting points for pulling the edges longitudinally and laterally.

3. In an apparatus for drawing continuous sheet glass vertically, width maintaining and sheet stretching mechanism, comprising members rotating on vertical axes constantly engaging the sheet edges at continually shifting points for pulling the edges longitudinally and laterally, and means for supporting and cooling the rotating members.

4. In an apparatus for drawing continuous sheet glass, means for laterally stretching the sheet, comprising opposed spirally threaded rollers mounted at the sides of the sheet edge with their axes parallel to the length of the sheet, and with the threads in engagement with the opposite faces of the edge of the sheet, and means for rotating the rollers so that the sheet-engaging threads move laterally outward.

5. In an apparatus for drawing and stretching sheet glass, vertical parallel spirally threaded cylinders mounted at the two sides of the edge portion of the sheet, means for rotating the cylinders, and means for holding the threaded portions of the cylinders against the sheet, the threads drawing the sheet upwardly and outwardly.

6. In an apparatus for drawing and stretching sheet glass, vertical parallel spirally threaded cylinders mounted at the sides of the edge portion of the sheet, means for rotating the cylinders, and means for yieldingly holding the threaded portions of the cylinders against the sheet, the threads tending to draw the sheet upwardly and outwardly.

7. In an apparatus for drawing and stretching sheet glass, vertical parallel spirally threaded cylinders mounted at the two sides of the edge portion of the sheet, means for yieldingly holding the threaded portions of the cylinders against the faces of the edge portion of the sheet, and means for rotating the cylinders so that the threads move toward the sheet edge thus drawing the sheet upwardly and outwardly.

8. In an apparatus for drawing and stretching sheet glass, a plurality of vertical parallel spirally threaded cylinders mounted adjacent each face of each edge of the sheet, the threads of each cylinder of a series at the same side of the sheet edge, engaging the sheet at different heights from the corresponding threads of the other cylinders of the series, means for rotating the cylinders, those of each series turning in the same direction and in unison, and means for yieldingly holding the cylinders against the sheet.

9. In an apparatus for drawing and stretching sheet glass, spirally threaded cylinders mounted at the two sides of the edge portion of the sheet with their axes of rotation substantially parallel to the sheet edge, means for holding the threaded portions of the cylinders yieldingly against the sheet, including means for supporting and cooling the cylinders, and means for rotating the cylinders so that the threads engaging the sheet move toward the sheet edge.

10. In an apparatus for drawing sheet glass, wherein the sheet is drawn upwardly from a bath of molten glass, width maintaining and sheet stretching devices, comprising substantially vertical threaded cylinders at the sides of the edges of the sheet, means for yieldingly holding the threaded portions of the cylinders against the sheet, and for cooling the cylinders, and means for rotating the cylinders at the two sides of the sheet in opposite directions, so that the threads will draw the sheet upwardly and outwardly.

Signed at Toledo, in the county of Lucas and State of Ohio, this 10th day of December, 1920.

CLIFFORD A. ROWLEY.